United States Patent

Shuck

(10) Patent No.: US 9,399,271 B2
(45) Date of Patent: Jul. 26, 2016

(54) HEAT TREATING AND BRAZING OF AN OBJECT

(75) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 266 days.

(21) Appl. No.: 13/312,348

(22) Filed: Dec. 6, 2011

(65) Prior Publication Data

US 2012/0160375 A1 Jun. 28, 2012

Related U.S. Application Data

(60) Provisional application No. 61/427,578, filed on Dec. 28, 2010.

(51) Int. Cl.
| | |
|---|---|
| B23K 31/02 | (2006.01) |
| B23K 35/24 | (2006.01) |
| B23K 1/008 | (2006.01) |
| B23K 3/08 | (2006.01) |
| F01D 5/30 | (2006.01) |

(52) U.S. Cl.
CPC ............... *B23K 35/24* (2013.01); *B23K 1/008* (2013.01); *B23K 3/085* (2013.01); *B23K 2201/001* (2013.01); *F01D 5/3061* (2013.01); *F05D 2230/237* (2013.01)

(58) Field of Classification Search
CPC ......... B23K 1/008; B23K 3/085; B23K 35/24
USPC .................... 148/528; 228/176, 214
See application file for complete search history.

(56) References Cited

U.S. PATENT DOCUMENTS

| | | | |
|---|---|---|---|
| 3,593,409 A | 7/1971 | Silverstein | |
| 3,972,466 A | 8/1976 | Keith | |
| 4,401,254 A * | 8/1983 | Tramontini | 228/217 |
| 4,506,822 A | 3/1985 | Hammersand et al. | |
| 4,804,128 A | 2/1989 | Brittin | |
| 5,670,264 A | 9/1997 | Sheridan | |
| 5,901,428 A | 5/1999 | Sheridan | |
| 5,915,462 A | 6/1999 | Hernandez et al. | |
| 6,079,613 A | 6/2000 | Sisskind et al. | |
| 6,112,971 A | 9/2000 | Castaldo et al. | |
| 6,409,074 B1 * | 6/2002 | Katoh et al. | 228/223 |
| 2003/0160088 A1 | 8/2003 | Mitten et al. | |

(Continued)

FOREIGN PATENT DOCUMENTS

| | | |
|---|---|---|
| DE | 19805079 A1 | 8/1999 |
| JP | 2001 217536 A | 8/2001 |

OTHER PUBLICATIONS

International Search Report and Written Opinion, PCT/US2011/067365, Rolls-Royce Corporation, Apr. 17, 2012.

(Continued)

*Primary Examiner* — Rebecca Lee
(74) *Attorney, Agent, or Firm* — Barnes & Thornburg LLP

(57) ABSTRACT

One embodiment of the present invention is a unique method for brazing an assembly. Another embodiment is a unique method of heat treating an object. Other embodiments include apparatuses, systems, devices, hardware, methods, and combinations for heat treating and/or brazing. Further embodiments, forms, features, aspects, benefits, and advantages of the present application will become apparent from the description and figures provided herewith.

22 Claims, 2 Drawing Sheets

(56) References Cited

U.S. PATENT DOCUMENTS

| | | |
|---|---|---|
| 2006/0054233 A1 | 3/2006 | Prociw et al. |
| 2007/0116978 A1 | 5/2007 | Starr |
| 2010/0068069 A1* | 3/2010 | Ahmad ........................ 416/97 R |

OTHER PUBLICATIONS

Extended European Search Report for European Application No. 11853303.3-1702 / 2658675 PCT/US2011/067365, Jun. 10, 2015, 8 pages.

* cited by examiner

HEAT TREATING AND BRAZING OF AN OBJECT

CROSS REFERENCE TO RELATED APPLICATIONS

The present application claims benefit of U.S. Provisional Patent Application No. 61/427,578, filed Dec. 28, 2010, entitled Heat Treating and Brazing of an Object, which is incorporated herein by reference.

FIELD OF THE INVENTION

The present invention relates to heat processing of objects, and more particularly, to heat treating and/or brazing objects.

BACKGROUND

The manufacture of objects, such as gas turbine engine components, by heat treating and/or brazing, remains an area of interest. Some existing systems have various shortcomings, drawbacks, and disadvantages relative to certain applications. Accordingly, there remains a need for further contributions in this area of technology.

SUMMARY

One embodiment of the present invention is a unique method for brazing an assembly. Another embodiment is a unique method of heat treating an object. Other embodiments include apparatuses, systems, devices, hardware, methods, and combinations for heat treating and/or brazing. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
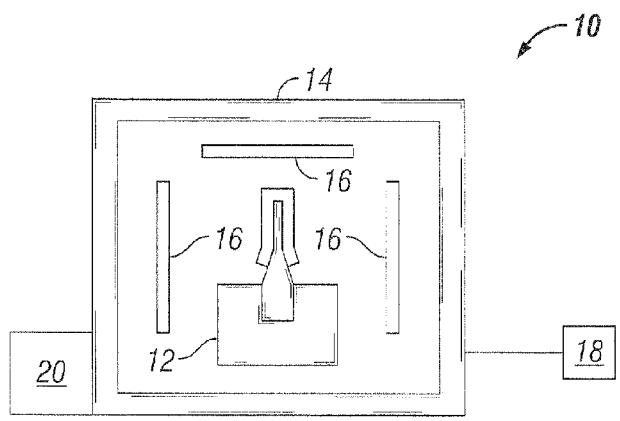
FIG. 1 schematically illustrates some aspects of a non-limiting example of a system for brazing an assembly in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, in particular FIG. 1, a non-limiting example of a system 10 for treating an object 12 in accordance with an embodiment of the present invention is schematically depicted. System 10 includes a furnace 14 having heating elements 16, and a controller 18. Controller 18 is operative to control the amount of heat supplied to object 12 via furnace 14, e.g., operative to control the temperature of heating elements 16. In one form, controller 18 is also operative to control the duration of heating. In other embodiments, the duration of heating may be manually controlled or may be controlled by one or more other systems.

Heating elements 16 are operative to heat object 12 in furnace 14. In one form, furnace 14 and heating elements 16 are configured to heat object 12 by radiation. In other embodiments, furnace 14 and heating elements 16 may be configured to heat object 12 by convection and/or conduction in addition to or in place of radiation.

In one form, furnace 14 is sized to heat a single object 12. In other embodiments, furnace 14 may be configured to heat a plurality of one or more types of objects. In one form, furnace 14 is a vacuum furnace, in which case system 10 includes means for drawing a vacuum in furnace 14. The vacuum may be a partial vacuum or a substantially full vacuum, depending upon needs of the particular application. In one form, system 10 includes a vacuum pump 20 operative to partially or substantially fully evacuate gases from furnace 14. In other embodiments, other systems for evacuating or purging gases from furnace 14 may be employed. Although the example of furnace 14 is described herein as a vacuum furnace, in other embodiments, furnace 14 may be any furnace or autoclave, and may have little or no atmosphere, an inert and/or other gas atmosphere or an ambient air atmosphere.

Figure 2:
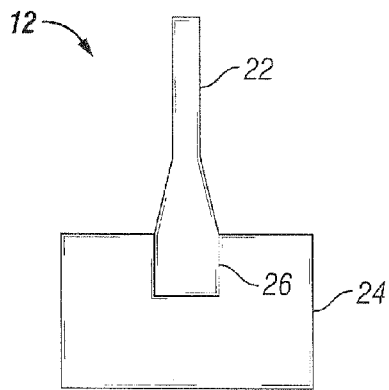
FIG. 2 illustrates some aspects of a non-limiting example of the assembly illustrated in FIG. 1.
Figure 3:
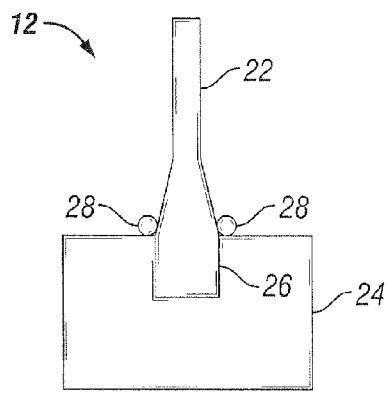
FIG. 3 illustrates some aspects of a non-limiting example of the assembly of FIG. 1 with a braze filler metal applied.
Figure 4:
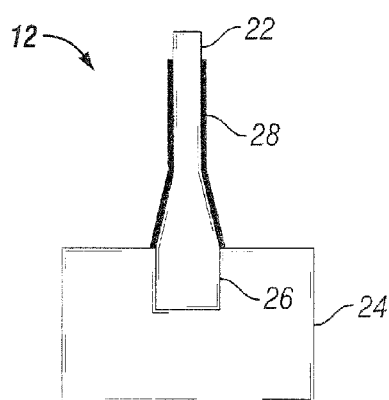
FIG. 4 illustrates some aspects of a non-limiting example of an assembly depicting braze filler metal having wetted undesirable portions of the assembly.

Referring to FIGS. 2-4, some aspects of a non-limiting example of object 12 in accordance with an embodiment of the present invention are depicted. In one form, object 12 is a gas turbine engine component. In other embodiments, object 12 may be any device or structure. In one form, object 12 is an assembly that is to be brazed together, e.g., in furnace 14. In other embodiments, object 12 may be one or more structures that are to be heat treated, e.g., in furnace 14. In still other embodiments object 12 may be an object or assembly that is to be heat treated and brazed, e.g., in furnace 14. In one form, object 12 is formed of a plurality of components or portions that are to be brazed together in furnace 14. In the example illustrated in the drawings, e.g., FIG. 2, object 12 is formed of portions 22 and 24 that are to be brazed together at a braze joint 26. Portion 22 is relatively thin compared to portion 24, and has a lower thermal mass than portion 24. In other embodiments, object 12 may have any number of portions.

In order to braze portions 22 and 24 together, a braze filer metal 28 is applied to object 12 adjacent to braze joint 26. Heating of portions 22 and 24 by heating elements 16 in furnace 14 raises the temperature of portions 22 and 24, with the goal of melting braze filler metal 28 so that it flows into braze joint 26. However, because portion 22 is thinner than portion 24, portion 22 heats up faster than portion 24, which results in braze filler metal 28 wetting the surface of portion 22 and flowing away from braze joint 26 because portion 22 reaches a temperature sufficient to melt braze filler metal 28 prior to portion 24 reaching the same temperature, which yields an undesirable result, depicted in FIG. 4. The melted braze filler metal 28 is depicted in FIG. 4 as thicker lines on portion 22 of object 12. In order to prevent the occurrence illustrated FIG. 4, it is possible to heat object 12 up to a temperature below the solidus point of braze filler metal 28 over a longer time period to allow portion 24 and portion 22 to achieve relatively similar temperatures just below the solidus point of braze filler metal 28. Once the temperatures of portions 22 and 24 are just below the solidus point, furnace 14 may be operated to slowly increase the temperature of object 12 in an attempt to melt braze filler metal 28 and cause it to flow into braze joint 26. However, such an approach is a time consuming process, resulting in higher energy costs and lower product throughput.

Figure 5:
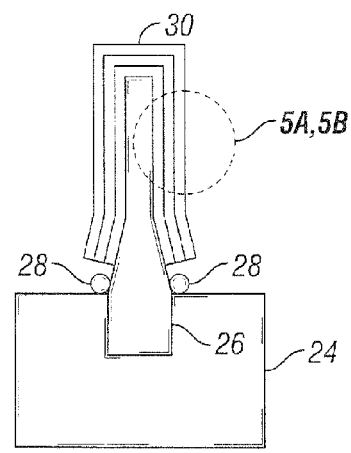
FIGS. 5, 5A and 5B illustrate some aspects of non-limiting examples of heat shields for shielding a portion of an object or assembly.
Figure 6:
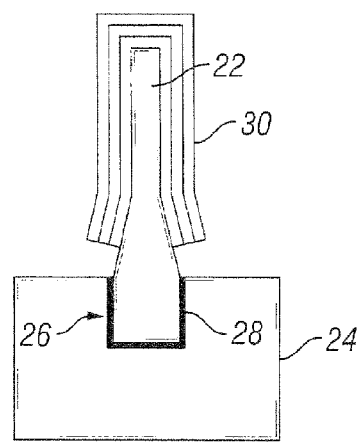
FIG. 6 illustrates some aspects of a non-limiting example of an assembly having a portion shielded by a heat shield in accordance with an embodiment of the present invention, depicting braze filler metal having flowed into a braze joint.

Referring to FIG. 5, in order to prevent portion 22 from achieving a temperature sufficient to melt braze filler metal 28 too soon, a heat shield 30 is employed. Heat shield 30 is formed and positioned on portion 22 to shield only portion 22 form heating elements 16, and to not shield portion 24 from heating elements 16. The radiation heat shield 30 may be positioned so that the radiation heat shield is supported by the assembly and the entire radiation heat shield 30 maintains a spaced-apart relationship with the braze filler metal 28 and the braze joint 26 both before and after melting the braze filler metal 28 to flow into the braze joint 26 as shown in FIGS. 5 and 6. In one form, heat shield 30 is configured to shield portion 22 from radiation emanating from heating elements 16 to reduce radiative heat transfer to portion 22. Heat shield 30 may also be configured to shield portion 22 from conduction and/or convection heating in addition to or in place of radiation heating. In one form, heat shield 30 is configured to conform to the shape of portion 22. In other embodiments, other shapes may be deployed.

Heat shield 30 is formed of one or more thin sheets of metal. The thickness of the sheet metal may vary with the needs of the application. In one form, sheet metal having a thickness in the range of 0.001" to 0.010" is employed. In other embodiments, other sheet metal thicknesses may be employed, including less than 0.001" thickness and/or more than 0.010" thickness. In one form, heat shield 30 is a layer of sheet metal. In one form, the material used to form heat shield 30 is a refractory metal, for example and without limitation, molybdenum, tantalum, niobium or their alloys. In other embodiments, other metals may be employed, including other refractory metals and/or their alloys, as well as common sheet metal materials, for example and without limitation, stainless steels or nickel alloys, in addition to or in place of refractory metals. In one form, heat shield 30 is laminated, being formed of a plurality of layers of sheet metal, for example and without limitation, sheet metal formed of one or more of the materials listed above. In one form, heat shield 30 is formed by wrapping portion 22 from a single sheet of sheet metal. In one form, the wrapping is performed in a spiral fashion, winding along a length and/or width of portion 22. In one form, the layers are formed as concentric layers, e.g., individual sheets wrapped around portion 22 and around each other. In various embodiments, each layer may also be formed by various means, including laser cutting, water cutting, electrical discharge machining and/or other techniques.

Figure 5A:
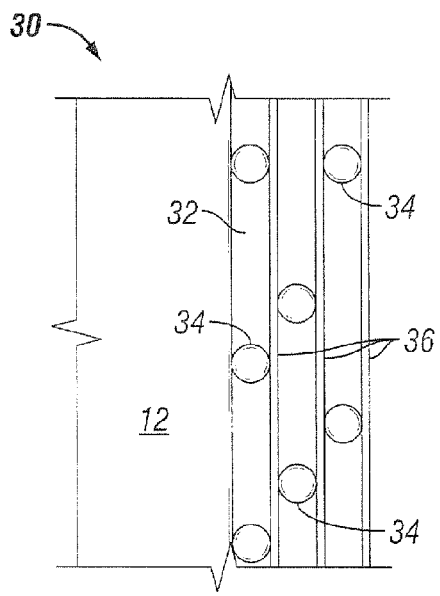
Figure 5B:
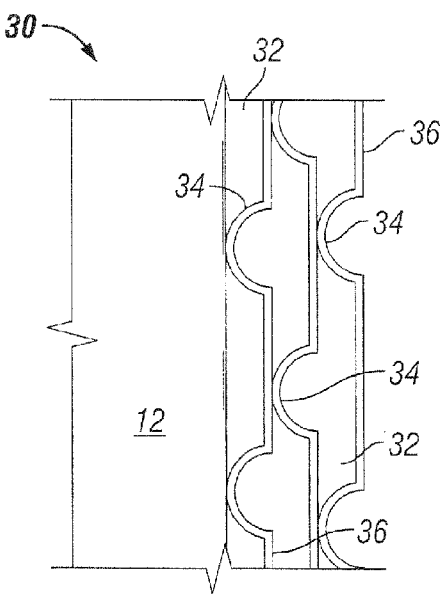

Referring to FIGS. 5A and 5B, in one form, heat shield 30 is configured to form a gap 32 between heat shield 30 and portion 22, e.g., to prevent heat conduction from heat shield 30 to portion 22. In one form, gap 32 is formed by one or more standoffs 34 disposed between heat shield 30 and portion 22. In one form, standoff 34 is a ceramic powder or is formed of a ceramic powder. In other embodiments, standoff 34 may take other forms, for example and without limitation, ceramic rope and/or metallic wire. In still other embodiments, standoffs 34 may be formed in layers 36 that form heat shield 30, e.g., dimples in one or more layers 36. In yet other embodiments, heat shield 30 may not be configured to form a gap between heat shield 30 and portion 22.

In one form, each layer 36 of heat shield 30 is also separated by a gap 32, e.g., formed by standoffs 34. In other embodiments, only some layers 36 may be separated to form gaps 32 therebetween. In still other embodiments, no gaps may be formed between layers 36 of heat shield 30. In one form, heat shield 30 is configured to permit gases between heat shield 30 and object 12, as well as between shield layers 36 to escape when a vacuum is drawn in furnace 14. In one form, heat shield 30 is configured, e.g., by the number and locations of layers 36 and gaps 32, to control the heat flux received by portion 22 from heating elements 16, e.g., to achieve a desired heating rate and/or peak temperature of portion 22. Heat shield 30 may also or alternatively be configured to control the cooling of portion 22 when furnace 14 is turned off and/or when object 12 is removed from furnace 14, e.g., to yield a desired cooling rate of portion 22. In various embodiments, one or more coatings, e.g., reflective and/or refractive coatings, may be deposited on one or more layers 36 in order to control the flow of heat to and/or from portion 22. In addition, other materials, such as insulation materials or coatings may be deposited on heat shield 30 and/or between layers 36 of heat shield 30 in order to control the flow of heat to and/or from portion 22.

In order to braze portions 22 and 24 together, braze filler metal 28 is positioned adjacent to braze joint 26. Heat shield 30 is then positioned on portion 22, and object 12 is placed into furnace 14. In one form, a vacuum is drawn in furnace 14, although in other embodiments a vacuum may not be drawn. In some embodiments, furnace 14 may be purged with an inert gas prior to heating. Heating elements 16 are activated to heat object 12 with heat shield 30. Heat shield 30 prevents portion 22 from heating up too quickly, e.g., promoting a more uniform temperature distribution as between portion 22 and portion 24. As a result, both portions 22 and 24 achieve a sufficient temperature to melt braze filler metal 28 so that it flows into braze joint 26, e.g., as depicted in FIG. 6, wherein the thick lines represent braze filler metal 28 within braze joint 26. After braze filler metal 28 has flowed into braze joint 26, the temperature inside furnace 14 is reduced, allowing object 12 to cool. Furnace 14 is then re-pressurized, e.g., brought up to atmospheric pressure, and object 12 is removed from furnace 14. Heat shield 30 is then removed from object 12. In some embodiments, heat shield 30 is configured to be reusable for subsequent objects 12, e.g., of the same configuration.

In some embodiments, a heat shield such as heat shield 30 may be configured to control the heating rate and/or cooling rate of portion 22 of object 12 during heat treating of object 12 in order to obtain a desired microstructure in the portion covered by heat shield 30, e.g., portion 22, that is different from the microstructure of other portions of object 12, e.g., portion 24. This may be performed as a heat treat operation alone or in conjunction with a brazing operation.

Embodiments of the present invention include a method for brazing an assembly in a furnace, comprising: applying a braze filler metal adjacent to a joint in the assembly; providing a radiation heat shield conforming to a shape of only a portion of the assembly, wherein the radiation heat shield is configured to reduce radiative heat transfer to the portion of the assembly; positioning the radiation heat shield on the assembly; placing the assembly and the radiation heat shield in the furnace; and heating the assembly and the radiation heat shield in the furnace to melt the braze filler metal into the joint.

In a refinement, the method further comprises positioning the radiation heat shield to shield only the portion of the assembly from heating elements of the furnace.

In another refinement, the method further comprises configuring the radiation heat shield to form a gap between the radiation heat shield and the portion of the assembly.

In yet another refinement, the method further comprises supplying a standoff to form the gap.

In still another refinement, the standoff is formed in the radiation heat shield.

In yet still another refinement, the method further comprises forming the radiation heat shield as a plurality of layers, each layer being separated by a gap.

In a further refinement, the method further comprises forming each layer from sheet metal.

In a yet further refinement, the method further comprises providing standoffs configured to form the gap between each layer.

Embodiments of the present invention include a method for treating an object, comprising: supplying a laminated heat shield conforming to a shape of a portion of the object; positioning the laminated heat shield on the portion of the object; placing the object and the laminated heat shield in a furnace; heating the object and the laminated heat shield in the furnace; and cooling the object and the laminated heat shield, wherein the laminated heat shield is configured to control a cooling rate of the portion of the object shielded by the laminated heat shield.

In a refinement, the method further comprises drawing a vacuum in the furnace.

In another refinement, the laminated heat shield is formed from a refractory metal.

In yet another refinement, the laminated heat shield is formed of a plurality of layers of a sheet metal.

In still another refinement, the method further comprises forming the layers by wrapping the portion with a sheet of sheet metal.

In yet still another refinement, the wherein the wrapping is performed in a spiral fashion.

In a further refinement, the layers are concentric.

In a yet further refinement, the method further comprises forming a different microstructure in the portion of the object than the balance of the object.

Embodiments of the present invention include a method for treating an object, comprising: wrapping a selected portion of the object in a plurality of layers of a sheet metal; separating at least a portion of each layer of the sheet metal from an adjacent layer of the sheet metal; placing the object in a furnace; and heating the object in the furnace to braze the object and/or heat treat the object.

In a refinement, the method further comprises forming standoffs in at least one layer of the sheet metal.

In another refinement, the method further comprises applying a braze filler metal adjacent to a joint in the object.

In still another refinement, the method further comprises further comprising selecting the number of layers based on a desired cooling rate for the portion of the object.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for manufacturing an assembly, the method comprising:
    brazing the assembly in a furnace, including:
        applying a braze filler metal adjacent to a joint in the assembly;
        providing a radiation heat shield conforming to a shape of only a portion of the assembly, wherein the radiation heat shield is configured to reduce radiative heat transfer to the portion of the assembly;
        positioning the radiation heat shield on the assembly, wherein the radiation heat shield is supported by the assembly in a location between a portion of the assembly and a heat source included in the furnace to shield the portion of the assembly from the heat source and the entire radiation heat shield maintains a spaced-apart relationship with the braze filler metal and the joint;
        placing the assembly and the radiation heat shield in the furnace;
        heating the assembly and the radiation heat shield in the furnace to melt the braze filler metal into the joint; and
        removing the radiation heat shield from the assembly.

2. The method of claim 1, further comprising positioning the radiation heat shield to shield only the portion of the assembly from heating elements of the furnace.

3. The method of claim 1, further comprising configuring the radiation heat shield to form a gap between the radiation heat shield and the portion of the assembly.

4. The method of claim 3, further comprising supplying a standoff to form the gap.

5. The method of claim 4, wherein the standoff is formed in the radiation heat shield.

6. The method of claim 1, further comprising forming the radiation heat shield as a plurality of layers, each layer being separated by a gap.

7. The method of claim 6, further comprising forming each layer from sheet metal.

8. The method of claim 6, further comprising providing standoffs configured to form the gap between each layer.

9. A method for brazing assemblies, the method comprising:
    supplying a laminated heat shield conforming to a shape of a portion of a first object;
    positioning the laminated heat shield on the portion of the first object and assembling the first object into a first assembly to form a first assembly joint;
    placing the first object and the laminated heat shield in a furnace so that the heat shield is arranged in a location between the first object and a heat source included in a furnace to shield at least a portion of the first object from the heat source;

heating the first object and the laminated heat shield in the furnace;

cooling the first object and the laminated heat shield;

removing the laminated heat shield from the first object;

positioning the same laminated heat shield on a portion of a second object and assembling the second object into a second assembly to form a second assembly joint; and placing the second object and the same laminated heat shield in the furnace so that the heat shield is arranged in a location between the second object and the heat source included in the furnace to shield at least a portion of the second object from the heat source, wherein the entire laminated heat shield is spaced apart from braze filler material arranged adjacent to the first assembly joint and braze filler material arranged adjacent to the second assembly joint.

10. The method of claim 9, further comprising drawing a vacuum in the furnace.

11. The method of claim 9, wherein the laminated heat shield is formed from a refractory metal.

12. The method of claim 9, wherein the laminated heat shield is formed of a plurality of layers of a sheet metal.

13. The method of claim 12, further comprising forming the plurality of layers by wrapping the portion with a sheet of sheet metal.

14. The method of claim 13, wherein the wrapping is performed in a spiral fashion.

15. The method of claim 12, wherein the plurality of layers are concentric.

16. The method of claim 12, further comprising configuring the laminated heat shield to obtain a desired microstructure in the portion of the first object different than the microstructure of the balance of the first object.

17. A method for brazing an assembly, the method comprising:

wrapping a selected portion of an object in a plurality of layers of a sheet metal;

separating at least a portion of each layer of the sheet metal from an adjacent layer of the sheet metal to form a heat shield;

assembling the object into an assembly to form an assembly joint between the object and another component;

placing the assembly in a furnace so that the heat shield is arranged in a location between a portion of the object and a heat source included in the furnace to shield at least a portion of the object from the heat source;

heating the assembly in the furnace to braze the object to the component assembly with a braze filler material; and removing the plurality of layers of the sheet metal from the selected portion of the first object, wherein the entire heat shield is spaced apart from the braze filler material.

18. The method of claim 17, further comprising forming standoffs in at least one layer of sheet metal.

19. The method of claim 17, further comprising applying a braze filler metal adjacent to a joint in the object.

20. The method of claim 17, further comprising selecting the number of layers based on a desired cooling rate for the portion of the object.

21. A method for manufacturing an assembly, the method comprising:

brazing the assembly in a furnace, including:

configuring a radiation heat shield to reduce radiative heat transfer to a desired portion of the assembly, and to promote a flow of braze filler metal into a joint in the assembly during the brazing process;

positioning the radiation heat shield on the assembly, wherein the radiation heat shield is supported by the assembly and the entire radiation heat shield maintains a spaced-apart relationship with the braze filler metal and the joint;

placing the assembly and the radiation heat shield in the furnace so that the heat shield is arranged in a location between the assembly and a heat source included in a furnace to shield at least a portion of the first object from the heat source; and heating the assembly and the radiation heat shield in the furnace to melt the braze filler metal into the joint.

22. The method of claim 21, wherein the radiation heat shield is configured to prevent or reduce the braze filler metal from wetting a surface of the portion of the assembly and flowing away from the joint during the brazing process.

* * * * *